United States Patent
Koehler et al.

(10) Patent No.: US 10,089,720 B2
(45) Date of Patent: Oct. 2, 2018

(54) ADAPTIVE APPLICATION OF METAL ARTIFACT CORRECTION ALGORITHMS

(71) Applicant: KONINKLIJKE PHILIPS N.V., Eindhoven (NL)

(72) Inventors: Thomas Koehler, Norderstedt (DE); Bernhard Johannes Brendel, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 702 days.

(21) Appl. No.: 14/354,685

(22) PCT Filed: Oct. 31, 2012

(86) PCT No.: PCT/IB2012/056041
§ 371 (c)(1),
(2) Date: Apr. 28, 2014

(87) PCT Pub. No.: WO2013/068887
PCT Pub. Date: May 16, 2013

(65) Prior Publication Data
US 2014/0286558 A1    Sep. 25, 2014

Related U.S. Application Data

(60) Provisional application No. 61/556,859, filed on Nov. 8, 2011.

(51) Int. Cl.
*G06T 5/00* (2006.01)
*G06T 5/20* (2006.01)

(52) U.S. Cl.
CPC .............. *G06T 5/002* (2013.01); *G06T 5/005* (2013.01); *G06T 5/20* (2013.01);
(Continued)

(58) Field of Classification Search
None
See application file for complete search history.

(56) References Cited

U.S. PATENT DOCUMENTS 5,243,664 A * 9/1993 Tuy ..................... G06T 11/005
  382/130
5,933,471 A    8/1999 Kalvin
(Continued)

FOREIGN PATENT DOCUMENTS

WO    2006082563 A1    8/2006

OTHER PUBLICATIONS

Shao, L., et al.; Coding Artifact Reduction Based on Local entropy Analysis; 2007, IEEE; pp. 691-696.
(Continued)

*Primary Examiner* — Sumati Lefkowitz
*Assistant Examiner* — Jiangeng Sun (57) ABSTRACT

An apparatus for and a method of correcting an image for an image artifact. An initial image is corrected by an image artifact corrector (190). The so corrected sample correction image is compared with the initial image to obtain information on the corrective action. The corrective action is then adaptively reapplied by a controller (140) to obtain an improved corrected image thereby ensuring previously present artifacts are removed and creation of new artifacts are avoided.

12 Claims, 3 Drawing Sheets

(52) U.S. Cl.
CPC ............... *G06T 2207/10081* (2013.01); *G06T 2207/10116* (2013.01); *G06T 2207/20012* (2013.01); *G06T 2207/20182* (2013.01); *G06T 2207/30004* (2013.01)

(56) References Cited

U.S. PATENT DOCUMENTS

| | | |
|---|---|---|
| 7,001,243 B1 | 2/2006 | Yi et al. |
| 7,991,243 B2 * | 8/2011 | Bal et al. ...................... 382/275 |
| 2008/0089606 A1 * | 4/2008 | Patnaik ......................... 382/275 |
| 2011/0013817 A1 | 1/2011 | Medow |
| 2011/0206258 A1 | 8/2011 | Chen et al. |

OTHER PUBLICATIONS

Watzke, O., et al.; A pragmatic approach to metal artifact reduction in CT: merging of metal artifact reduced images; 2004; Eur. Radiol.; 14:849-856.

* cited by examiner

ADAPTIVE APPLICATION OF METAL ARTIFACT CORRECTION ALGORITHMS

CROSS REFERENCE TO RELATED APPLICATIONS

This application is a national filing of PCI application Serial No. PCT/IB2012/056041, filed Oct. 31, 2012, published as WO 2013/068887 A1 on May 16, 2013, which claims the benefit of U.S. provisional application Ser. No. 61/556,859 filed Nov. 8, 2011, which is incorporated herein by reference.

FIELD OF THE INVENTION

The invention relates to an apparatus for correcting an image for an image artifact, to a method of correcting an image for an image artifact, to a medical image processing system for correcting an image for an image artifact, to a computer program product, and to a computer readable medium.

BACKGROUND OF THE INVENTION

Metal implants or other high density parts often cause image artifacts in CT images. Metal artifact reduction (MAR) algorithms are know which reduce the image artifacts in most cases. An MAR algorithm is known from U.S. Pat. No. 7,991,243.

However, there is the remaining problem that even the best algorithms known so far occasionally create new artifacts.

SUMMARY OF THE INVENTION

There is therefore a need to improve image artifact reduction algorithms.

The object of the present invention is solved by the subject matters of the independent claims, wherein further embodiments are incorporated in the dependent claims.

It should be noted that the aspects described in the following apply also to the method of correcting an image for an image artifact, to the medical image processing system for correcting an image for an image artifact, to the computer program product, and to a computer readable medium.

According to one aspect there is provided an apparatus for correcting an image for an artifact.

The apparatus comprises an input unit for receiving an initial image, a processing unit for processing the image to effect the correction and an output unit for outputting a corrected version of the initial image.

The processing unit comprises a correction sampler configured to forward the initial image to an artifact corrector and to receive therefrom a sample of a corrected image. The sample image is the result of a corrective action applied to the initial image by the artifact corrector.

The processing unit further comprises a comparator configured to compare the initial image and the corrected sample image to so establish a corrector image representing the corrective action of the artifact corrector on the initial image.

The processing unit further comprises an artifact correction controller configured to adaptively re-apply the respective corrective action in a weighted manner to any one of a plurality of image points in the initial image. The weights or weight factor used per image point for the weighting of the corrective action are related to a degree to which image information in a neighbourhood around that image point is compensable by corresponding image information in a corresponding neighbourhood in the corrector image, The so adaptively re-corrected initial image is then output by the output unit as the corrected image.

In other words, the corrective action is adaptively re-applied by the controller to obtain an improved, final corrected image, thereby ensuring previously present artifacts are removed and creation of new artifacts are avoided.

The apparatus allows applying an existing artifact corrector implementing a known metal artifact reduction (MAR) algorithm.

The apparatus can be used as an "add-on" to existing MAR systems. The apparatus is a "meta-image-artifact corrector" because it examines correction results output by existing MAR systems and then improves the correction results by adaptively re-applying the corrective action using the corrector image as a "roadmap". The corrector image records the existing MAR system's estimate of corrective action for the initial image.

The apparatus acts in a "doubly" adaptive manner, namely in a quantitative and a spatial sense: controller determines where, that is at which image points in the initial image, the estimated corrective action is to be applied and how much, that is attenuated or amplified, of the corrective action is to be applied at that locale.

The apparatus operates in a two phase fashion: in a first, sample run, the artifact corrector is applied globally to the initial image to obtain the sample corrected image and to so gather information on the corrective action of the algorithm on the initial image.

The corrective action is recorded in the corrector image. Using the corrector image, the corrective action recorded therein is adaptively and selectively applied in a second, final run, but this time the corrective action is applied only locally in image regions where the "correction image" shows features which are also present in the original, initial image.

The controller acts neighbourhood-wise. Centred around each image point in a previously defined region of the image plane (which may include the whole of the image plane safe for a border area around the image frame), a sub-region or neighbourhood ("patch") is defined. This patch is then mapped into the corrector image to define a corrector image neighbourhood corresponding to the initial image neighbourhood to so obtain for each image point a pair of neighbourhoods.

The compensatory degree (hereinafter the "degree") measures the suitability of the image information in the two neighbourhoods to compensate or cancel each other. The degree or the corrective weights associated with the degree indicate the extent to which image information is mirrored or is similar across the pairs of neighbourhoods. As such the degree is a property of each of the respective pairs of initial image neighbourhoods and corrector image neighbourhoods. Because the neighbourhoods correspond to each other, either of the neighbourhood can be said to "have" the degree.

High compensatory degree or capability of the neighbourhood results in maintenance or even amplification of the corrective action (ideally non-attenuated if artifact is completely compensated or annihilated, with weight or attenuation factor close to "1") whereas low compensatory degree or capability results in attenuation or complete elimination, with weight factor with absolute value less than 1 or even close to naught.

In other words the higher the compensatory degree the higher the amplification of the corrective action at the respective centre image point, and the lower the compensatory degree the higher the attenuation of the corrective action at the respective centre image point.

An image artifact is an image feature defined by a local pixel pattern which is expected to show in the correction image also albeit in opposite pixel or voxel intensity so that the artifact can be compensated or annihilated after adaptive application of the corrector image to the initial image.

All MAR algorithms can be formulated in a way that there is an initial image, that suffers from metal artifacts and the algorithm creates a corrector image that is added to the initial image. The apparatus may therefore be put to use for MAR algorithms do not follow this form explicitly but they rather create directly a corrected image.

In one embodiment the difference between the corrected image and the original image is calculated and this difference is used as the corrector image.

The apparatus carries into effect the idea of applying the correction image "locally" in regions where it compensates artifacts but to avoid the application where it would create new artifacts.

The apparatus allows distinguishing between these two cases by using the concept of the compensatory degree. According to one embodiment, the weights are computed using an entropy measure for the combined image information formed from the neighbourhood pair per centre initial image point.

According to an alternative embodiment the statistical correlation coefficient between the image information in each of the pairs of neighbourhoods is computed.

According to one embodiment, the controller is configured to adjust a previously set default size for the corrector image neighbourhood until the entropy of the image information in the corrector image neighbourhood exceeds a predetermined threshold value.

Dynamically adjusting the neighbourhood size (measured in number of pixels or voxels) allows to keep the run-time of the algorithm at bay as this would increase with neighbourhood size. Choosing the threshold entropy value allows to balancing size for run-time: the entropy cost function may turn out rather flat for a too small a neighbourhood size due to lack of image information or structure in the small neighbourhood. A too large a neighbourhood however is computationally prohibitive and it further impedes a proper correction of artifact present in a small region.

The apparatus selects an appropriate neighbourhood size by accounting for image structure in the neighbourhood, where "structure" is measured by the entropy function, where the entropy of an image is preferably defined as the entropy of the normalized histogram of grey values in that neighbourhood. If the correction image is rather flat in a neighbourhood, then the pixel grey value histogram is highly peaked and has high entropy. Using entropy as a structure measure, this means that a large neighbourhood should be selected. On the other hand, if the correction image has fine streaks in a neighbourhood, the histogram shows several peaks and has lower entropy. Consequently, a smaller neighbourhood can be selected.

It is understood that the apparatus may also be put to use with artifact correction algorithms other than MARs. The artifact may be caused not necessarily by "metal" parts but by any other highly radiation attenuating part. The apparatus may be used for any image artifact corrector whatever the cause for the image artifact or whatever the particular algorithm underlying the existing artifact corrector.

In an alternative off-site embodiment the controller controls the production of the final corrected image at the remote artifact controller.

Definitions

Amplifying corrective action includes maintaining the corrective action as provided by the MAR at a single given image point, the weight equalling at least unity in this later case.

Attenuation of corrective action includes eliminating the corrective weight at a single given image point, the weight being around naught in this case.

Image is to be construed broadly as an at least 2-dimensional array, matrix or similar data structure holding numerical data items, each addressable by at least two-dimensional coordinates i,j.

Image information or feature is a particular pixel value pattern given by a particular pixel value distribution across the pixels making up the patch or region in the image plane.

BRIEF DESCRIPTION OF THE DRAWINGS

Exemplary embodiments of the invention will now be described with reference to the following drawings in which.

DETAILED DESCRIPTION OF EMBODIMENTS

Figure 1:
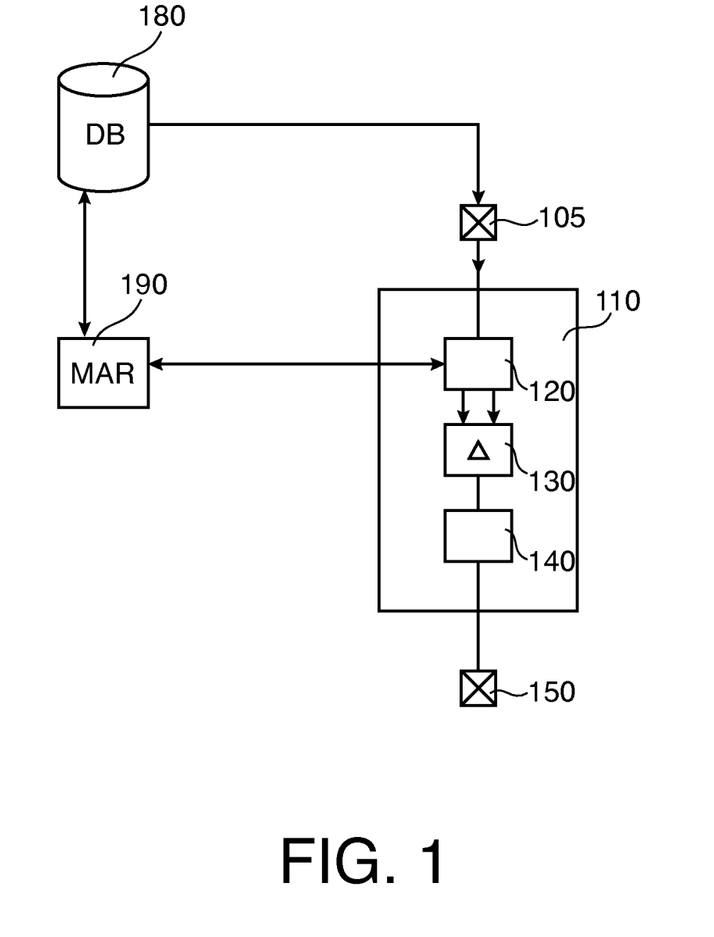
FIG. 1 schematically shows a block diagram of an apparatus for image correction according to one embodiment of the invention.

To the right of FIG. 1 there is shown a block diagram of an apparatus for correcting an image for an artifact.

The apparatus comprises an input unit or interface means 105, a processing unit 110 and an output unit or interface means 150.

Input 105 is configured to access a data base system 180 to retrieve therefrom an initial digital image having an image artifact.

Data base 180 may be arranged as a PACS in a medical facility and is holding medical image data such as 2D computed tomography (CT) projection images or reconstructed 2D or 3D cross sectional images, also commonly referred to as slice images or "slices". The images are in a suitable digital format such as DICOM format. The apparatus is arranged to connect via interface means 105 and a suitable computer communication network to data base 180.

To the left of FIG. 1 there is shown an artifact corrector module MAR 190 implementing a known metal artifact reduction (MAR) algorithm. The embodiment of the apparatus as diagrammatically shown in FIG. 1 is arranged as an "add-on" for an existing MAR 190 system. The MAR 190 may have access to additional data related to the image such as the projection data on which the initial image is based on, or a priori information about the highly attenuating part such as CAD information of orthopaedic implants.

In yet other embodiments however the apparatus may include a native MAR as a component of processing unit 110.

The apparatus' processing unit 110 comprises a correction sampler 120, a comparator 130 and an artifact correction control 140.

In one embodiment, the apparatus components 105, 150, 120, 130 and 140 are running as software routines on processing unit 110. However, a distributed architecture of the apparatus where the components are connected in a suitable communication network is also contemplated in alternative embodiments. The components may also be arranged as dedicated FPGAs or hardwired standalone chips. The components may be programmed in a suitable scientific computing platform such as Matlab® or Simulink® and may then be translated into for, example, C++ or C routines maintained in a library and linked when called on by processing unit 110.

Broadly speaking, the apparatus for correcting an image for an artifact connects via input unit 105 to data base 180 and retrieves therefrom an initial image having an image artifact. The image artifact may have been the result of a high density part such as a metal part residing in an object whilst CT images are taken of the object.

The image may be a slice image reconstructed from a set of projection data acquired with a CT system.

The object of interest may be a part of a human or animal body and the high density parts may include a metallic part or other high density part such as a bone structure embedded in patient's soft tissue. Image artifact such as streaks, distortions and shades may present in the acquired initial image due to the part exercising a higher attenuation on the radiation used in the CT run than the average attenuation of the surrounding soft tissue.

After reading-in the initial image for image correction, correction sampler 120 forwards initial image to MAR 190 and requests MAR 190 to process the initial image to output a MAR corrected sample image which is then received back at the correction sampler 120.

The initial image and its MAR corrected sample image is then forwarded to a comparator 130. Comparator 130 compares the two images and produces a corrector image recording the corrective action of MAR 190 on the initial image.

Corrector image represents the corrective action per image point ij of the MAR correction on the initial image. Corrector image is then forwarded to artifact correction controller 140 to directly obtain the final corrected image by using the corrector image in combination with the initial image.

Controller 140 then re-applies the corrective action to the initial image as per corrector image but this time uses weights to modify the corrective action per image point in the initial image. The individual weights or weight factors are computed by controller 140 as a parameter. Around each of the to-be corrected image points in the image plane of initial image, a patch or neighbourhood is defined by the controller. For each of the initial image neighbourhoods so defined a corresponding neighbourhood in the corrector image is defined by controller. For each of the so defined pairs of neighbourhoods, controller 140 computes a numerical weight. Each weight measures the degree to which image information in the initial neighbourhood is compensable by the image information in the corrector image neighbourhood.

Controller 140 then looks up in the corrector image the corrective action that was previously estimated by the MAR 190 to be applied to any given point. The estimated corrective action is then weighted by the respective weight and the so re-weighted corrective action is then applied by controller 140 to the respective image point in the initial image. Proceeding in this fashion for each or a selection of image points in the initial image, the final corrected image is build-up. The weights or parameters are computed by controller 140 according to different principles and each embodiment will be explained in more detail below under the heading "Operation".

Controller 140 then passes the final corrected image to output interface means 150. The final corrected image can then be dispatched across the communication network to data base 180 or can be forwarded to an image renderer and rendered for view on a screen.

In another "off-site" embodiment, controller 140 instructs MAR unit to re-correct the initial image but this time the correction operation at MAR 190 is controlled by artifact correction controller 140 using the corrector image as explained above. In this embodiment controller 140 interfaces during runtime with MARs 190's algorithm and instructs the weights to be used in MAR 190's foreign algorithm. In this embodiment controller 140 is equipped with suitably programmed API's to effect the interaction and the image correction algorithm at MAR 190 may have to be suitably adapted to carry into effect the control function of controller 140 at MAR 190.

In the off-site embodiment, once the final corrected image is produced at MAR 190 under the control of controller 140, final corrected image is then is then fed back to controller 140 which in turn passes the off-site corrected image to output interface means 150. In yet another embodiment, MAR 190 may output the final corrected image and so release same for further post-processing to database 180 or otherwise.

Operation

Initial image $\mu_{ij}$ is formed as a matrix including rows i and columns j. Matrix entry at row i and column j is a numerical value representing a grey value level of a pixel/voxel element. Each artifact in initial image $\mu_{ij}$ is formed as distinctive image features defined by region of those pixel and voxel elements. The following reference will be made only to pixel elements but it is understood that the following applies equally to voxel elements.

The sample correction image $\sigma_{ij}$ produced at MAR 190 and requested by correction sampler 120 is formed of the same number of rows and columns as the image $\mu_{ij}$ but has in general different pixel value entries because of the corrective action experienced at MAR 190.

Comparator 130 is configured to generate the corrector image $c_{ij}$ based on initial image $\mu_{ij}$ and sample image $\sigma_{ij}$. In one embodiment the comparator 130 forms the pixel-wise difference between the initial image $\mu_{ij}$ and sample image $\sigma_{ij}$ resulting in the corrector image $c_{ij}$ having the same number of rows and columns as initial image $\mu_{ij}$ or sample image $\sigma_{ij}$. This difference value is then representative for the corrective action at that image point i,j. Corrector image $c_{ij}$ along with initial image $\mu_{ij}$ is then forwarded for processing to controller 140.

Controller 140 is configured to use corrector image $c_{ij}$ and to adaptively apply a repeated correction to initial image $\mu_{ij}$. Controller 140 is configured to apply the correction image $c_{ij}$ to initial image $\mu_{ij}$ only locally, that is, application is restricted to regions where the corrective action of the corrector image $c_{ij}$ would compensate an artifact but application of corrected action is avoided or sufficiently attenuated in other regions of initial image $\mu_{ij}$ where new artifacts would be created.

The algorithm implemented by controller 140 allows distinguishing between those two cases which will be explained in more detail below.

Figure 2:
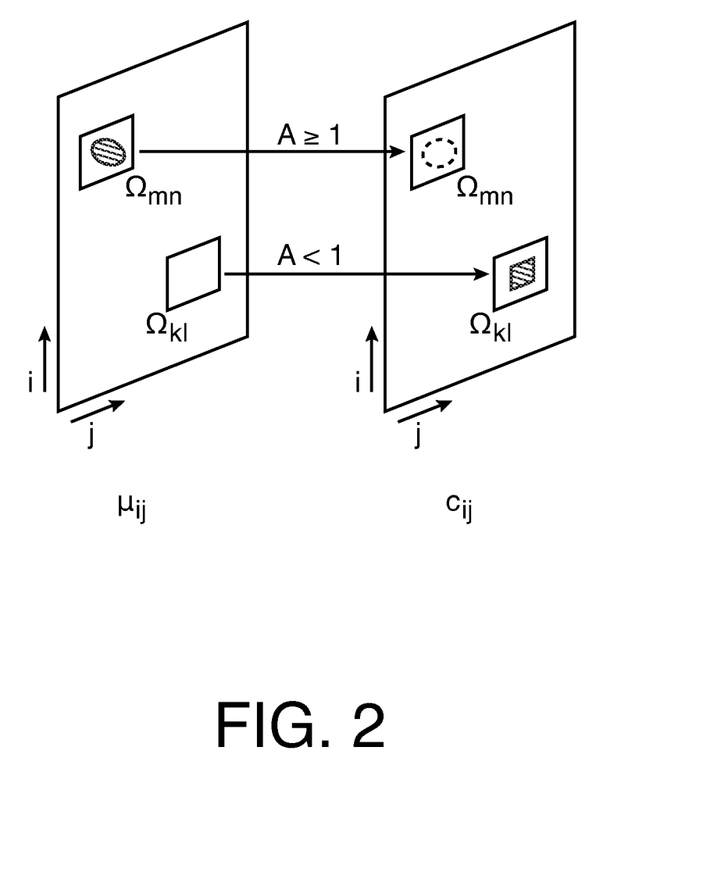
FIG. 2 diagrammatically shows operation of the apparatus of FIG. 1 according to one embodiment of the present invention.

FIG. 2 affords a diagrammatical explanation of the operation of controller 140.

To the left of FIG. 2, initial image patch $\Omega_{mn}$ includes an artifact diagrammatically shown as a dark ellipse. Corresponding corrector image patch $\Omega_{ij}$ includes matching or similar image structure or information as shown in form of a light dashed ellipse matching the structure in initial image patch $\Omega_{mn}$ for shape but shown with opposite grey values. So MAR 190, for dark ellipse artifact, correctly estimated the corrective action because corrector image $c_{ij}$ when applied to the image points in patch $\Omega_{mn}$ would compensate dark ellipse artifact completely. Image information in patch $\Omega_{mn}$ has therefore a high compensatory degree. Controller 140 therefore computes a parameter A larger unity to at least maintain or even amplify the corrective action as recorded by corrector image $c_{ij}$ for image points in that path patch $\Omega_{mn}$.

Patch $\Omega_{kl}$ shows the opposite scenario. Here, MAR 190 incorrectly estimated the corrective action because it would, if applied, introduce a dark rectangular artifact (shown to the lower right in FIG. 3) where there is no artifact at all as shown in "clean" path $\Omega_{kl}$ to the lower left in FIG. 3. Controller 140 therefore computes for patch $\Omega_{kl}$ a very low compensatory degree, because the structures in both patches do not match. Control parameter A is therefore attenuative with a value less than unity and close to naught to so annihilate or eliminate the MAR 190 proposed corrective action for image points in patch $\Omega_{kl}$.

According to one embodiment controller 140 reads in initial image $\mu_{ij}$ defines for each point i, j neighbourhood $\Omega_{ij}$ (also called a "patch") around that point i,j. The point may be referred to as the centre point of that patch, each patch having at least one such centre or "seed" point. Neighbourhood $\Omega_{ij}$ defines a sub set in the image plain and may be given by a rectangular region with n×n pixel height and width. In an embodiment an 11×11 pixel square is chosen as the default size for neighbourhood $\Omega_{ij}$.

In other embodiments neighbourhood $\Omega_{ij}$ is a circle having a specified radius r around each of the image points i,j.

Controller 140 then maps this neighbourhood $\Omega_{ij}$ into a corresponding neighbourhood $\Omega_{ij}$ in corrector image $c_{ij}$. According to one embodiment this is done by using the same pixel co-ordinates as defined for the corresponding neighbourhood in corrector image $c_{ij}$.

In one embodiment, to save CPU time the neighbourhoods are not defined for each and every pixel image pixel point in initial image $\mu_{ij}$ but are restricted to a region which is likely to include the artifact. This region of interest in the image plane can be established for example by use of a suitably programmed segmentor. The image points i, j as centre points for the respective neighbourhoods $\Omega_{ij}$ are chosen sufficiently far away from the border of image $\mu_{ij}$ to ensure that the neighbourhoods are well defined and would not extend beyond the current frame.

In one embodiment controller 140 calculates the weights as the statistical correlation coefficient between pixel values in the patch $\Omega_{ij}$ of initial image $\mu_{ij}$ and the corresponding patch $\Omega_{ij}$ in corrector image $c_{ij}$. Calculation for statistical correlation coefficient is according to the following formula:

$$t_{ij} = \frac{\sum_{(i',j') \in \Omega_{ij}} (\mu_{i'j'} - \overline{\mu_{ij}})(c_{i'j'} - \overline{c_{ij}})}{\sqrt{\sum_{(i',j') \in \Omega_{ij}} (\mu_{i'j'} - \overline{\mu_{ij}})^2 \sum_{(i',j') \in \Omega_{ij}} (c_{i'j'} - \overline{c_{ij}})^2}}$$

where $\overline{\mu_{ij}}$ and $\overline{c_{ij}}$ denote the average pixel value in initial image patch and corrector image patch, respectively.

The pixel values of the final corrected image $f_{ij}$ are then calculated according to:

$$f_{ij} = \mu_{ij} - t_{ij} c_{ij}$$

In one embodiment, the range of values of $t_{ij}$ are windowed and transformed into a selectable range by a clipping-function A.

In one embodiment a partly sinusoidal function is defined:

$$A(t = t_{ij}) = \begin{cases} 1 & t < t_0 \\ 0.5 + 0.5\cos(\pi(t + t_0)/t_0) & t_0 \le t \le 0 \\ 0 & 0 < t \end{cases}$$

In the formula A(t) designates control parameter which varies between 0 for positive correlation ($t_{ij}=1$) and 1 for perfect anti-correlation ($t_{ij}=-1$), that is, negative correlation, and defines a smooth sinusoidal transition between these two extremes.

Cut-off parameter $t_0$ varies between minus 1 and zero and defines a cut-off point at which the correlation coefficients $t_{ij}$ are considered to be "negative enough" to warrant unchanged that is un-attenuated application of the corrective action by corrector image $c_{ij}$ at that point i,j.

Using the clipping function A(t), the final corrected image pixels are then computed as:

$$f_{ij} = \mu_{ij} + A(t)c_{ij}$$

In one embodiment correlation between the patches is made more robust by tracking with a segmentor, regions that are representative of bones or other high density matter. Those regions are then excluded from the respective patches prior to the calculation of the correlation coefficients in respect of that patch.

In another embodiment controller 140 is configured to calculate the weights according to the entropy with respect to each pair of patches.

In the entropy based embodiment, the weight for each patch pair is determined by the following formula:

$$\min_{A'} H(\mu_{\Omega_{ij}} + A' c_{\Omega_{ij}})$$

In other words, controller 140 is configured to solve for:

$$A_{ij} = \arg\min H(\text{Histogram}(\mu_{\Omega_{ij}} + A' c_{\Omega_{ij}})); \; A' \in [a;b] \subset \mathbb{R} \quad (1),$$

where H denotes the entropy function $$H(P) = -\sum_i p_i \log p_i$$

and $\mu_{\Omega_{ij}}$ and $c_{\Omega_{ij}}$ denote initial image and correction image, each restricted to the selected patch $\Omega_{ij}$.

Entropy function H can be calculated by establishing a pixel level intensity histogram for each patch as indicated in formula (1) above. Intervals ("bins") of pixel values are defined for each patch and the number of pixels having a value falling in any one of the bins are recorded.

Approximating for each bin the value $p_i$ of P by the normalized fraction of pixels having a value in the respective bin range yields the desired histogram.

The histogram can then be used as an approximation of the probability mass function $P=(p_i)$ of a random Variable X, each pixel value i,j in the patch considered a sample of i.i.d. pixel value random variable X.

According to one embodiment, a=−0.5 and b=1.5 but it is understood that another reasonable solution space may also be chosen in accord with the requirements of the instant artifact correction problem. Allowing values larger than 1 accounts for a situation, where the artifact strength has been underestimated. Negative values for $A_{ij}$ may occur if the shape of the artifact structure has been estimated correctly, but with inverse intensity.

In formula (1) for the corrective parameter, a linear combination of the restricted images is formed in the vector space of matrices. The scalar $A_{ij}$ measures how much of the corrective action of corrector image $c_{ij}$ should added in patch $\Omega_{mn}$, thereby adding as little image information as possible, that is, to minimize the entropy of the linearly combined image.

In one embodiment the bins for the histogram are chosen at increments of 10 Hounsfield Units (HU) and the default neighbourhood size is 11×11 pixels.

The apparatus allows the user to configure bin levels and the default neighbourhood size.

Having solved for A at any given image point i,j, the corrective action at the respective neighbourhood centre point i,j is then weighted by $A_{ij}$ according to its degree as measured by the entropy of its neighbourhood pair as the image structure measure:

$$f_{ij}=\mu_{ij}+A_{ij}c_{ij}$$

Using the entropy of the combined image of both patches as the weight ensures that the resulting final corrected image has the minimum amount of image features. It is thereby ensured that application of the corrector does not add new artifacts, that is, new image information or features that were not previously in the initial image.

In one embodiment weights $A_{ij}$ are restricted to the unit interval with a=0 and b=1. The parameter calculated as the minimum entropy in the unit interval will assume a value 1 or close to 1 if the corrector image contains only artifact structures that are already present in the initial image $\mu_{ij}$.

Weight $A_{ij}$ will assume a value of 0 or close to 0 if the corrector image $c_{ij}$ contains only new image information (a new artifact) that is not present in the initial image $\mu_{ij}$.

In another embodiment the computed weight is reasonability checked in a Bayesian estimator framework. Improbable values are discarded and reset to a most probable value, for instance by determining $A_{ij}$ according to:

$$A_{ij}=\min{}_{A'}H(\mu_{\Omega_{ij}}+A'c_{\Omega_{ij}})-p(A'),$$

where p is an a priori probability function (also called "a prior") for the weighting factor, for example a Gaussian distribution function with expectation value of 1.

Either of the above embodiments corrector 140 can further be configured to use the calculated entropy when selecting the size, for example, edge width or diameter of the patches. In this method the patch is selected based on the information content in that patch of the corrector image $c_{ij}$.

Choosing the patches in accordance with the entropy of the pixel regions enclosed by the patch results in saving of CPU time and improvement of the quality of the finally corrected image. Using the entropy allows distinguishing image regions rich in information from flat regions where there is little structure. A flat region in correction image $c_{ij}$ has a pixel value histogram that is peaked and the region therefore has high entropy, in other words using the entropy function H as a structure measure will result in a larger than average neighbourhood or patch to be selected for that region. On the other hand, if a region in the correction image $c_{ij}$ contains more image structures such as streaks, shades or singularities, the pixel value histogram for that region is likely to show several peaks and consequently would have higher entropy. In this high entropy case controller 140 is configured to choose a smaller than average patch in that region. According to one embodiment patches are therefore adaptively chosen according to the entropy of the region enclosed by the patch.

According to one embodiment a default patch size is chosen and scaled according to the entropy calculated in that patch. Controller 140 uses a configurable average entropy value to affect a scaling with respect to that average value.

In other embodiments, controller 140 implements other image structure measures than entropy such as variance of image values or mean absolute differences from the mean.

Figure 3:
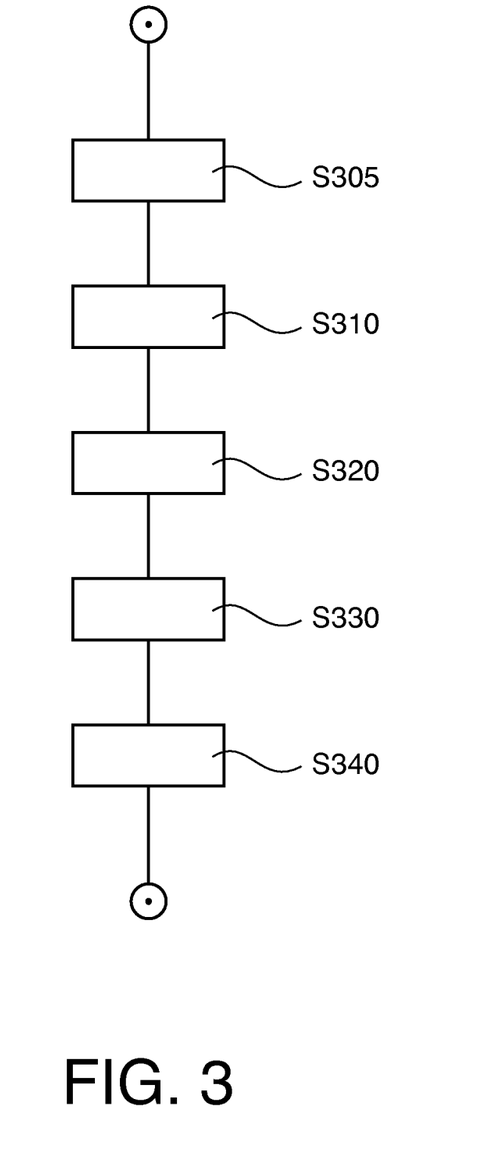
FIG. 3 shows a flow chart of a method of correcting images according to one embodiment of the present invention

With reference to FIG. 3, a flow chart is shown of a method of correcting an image for an image artifact.

In step S305, the initial image is received.

In step S310 the initial image is forwarded to an existing artifact corrector to receive therefrom a sample of a corrected image. The sample corrected image is the result of an estimated corrective action applied to the initial image by the artifact corrector algorithm implemented by the artifact corrector.

In step S320, the initial image and the corrected sample image are compared. The result of the comparison is then recorded as a corrector image representing the corrective action of the artifact corrector per initial image point ij in the initial image.

In an optional step a default neighbourhood size is adjusted (S330) until the entropy of the image information in the previously set default sized corrector image neighbourhood exceeds a predetermined threshold value. The threshold and the default size are both configurable and the adjustment means in general to enlarge the neighbourhood to secure an adequate amount of entropy. A reasonable amount of entropy may for example be 0.05 or 0.1.

In step S340 the respective corrective action is then adaptively re-applied in a weighted manner to any one of a plurality of image points in the initial image. The weights used per image point for the weighting of the corrective action relate to the degree to which image information in a neighbourhood around that image point is compensable by corresponding image information in a corresponding neighbourhood in the corrector image. The plurality may include all image points in the initial image (other than a band of image points along the border or the image frame) or a selection of image points that has been established to most likely include the image artifacts. A segmentation step may be used to so suitable prune down the image plane to a region of interest. Optionally, in a similar manner, the image plane may be trimmed to exclude image background areas.

In one embodiment, the weights are computed to minimize per neighbourhood the entropy of a combination of image information from both, the respective initial image neighbourhood and the corresponding corrector image neighbourhood.

In an alternative embodiment the weights are computed per neighbourhood as a statistical correlation coefficient between image information in the respective initial image neighbourhood and the corresponding image information in the corresponding corrector image neighbourhood.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. For example, the embodiment is described with reference to a CT scanner but it can be readily applied to 3D X-ray imaging as well. Furthermore, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus for correcting an X-ray image for an artifact, the apparatus comprising:
a processor configured to implement:
an input unit for receiving an initial X-ray image;
a processing unit for processing the image to effect the correction; and
an output unit for outputting a corrected version of the initial image;
the processing unit comprising:
a correction sampler configured to forward the initial image to an artifact corrector and to receive therefrom a sample of a corrected image, the sample image being the result of a corrective action applied to the initial image by the artifact corrector;
a comparator configured to compare the initial image and the corrected sample image to so establish a corrector image representing the corrective action of the artifact corrector on the initial image; and
an artifact correction controller configured to adaptively re-apply the respective corrective action in a weighted manner to any one of a plurality of image points in the initial image, the weights used per image point for the weighting of the corrective action related to a degree to which image information in a neighbourhood around that image point is compensable by corresponding image information in a corresponding neighbourhood in the corrector image, and
the output unit configured to output the so adaptively re-corrected initial image as the corrected image.

2. The apparatus of claim 1, wherein the weights are neighbourhood dependent and indicative of the compensatory degree, the weights attenuating or amplifying the corrective action at any given image point, the attenuation varying inversely to the compensatory degree and the amplification varying directly with the compensatory degree.

3. The apparatus of claim 1, wherein the controller is configured to compute the weights to minimize per neighbourhood the entropy of a combination of image information from both, the respective initial image neighbourhood and the corresponding corrector image neighbourhood.

4. The apparatus of claim 1, wherein the controller is configured to compute the weights per neighbourhood from a statistical correlation coefficient between image information in the respective initial image neighbourhood and the corresponding image information in the corresponding corrector image neighbourhood.

5. The apparatus of claim 1, wherein a size of the corresponding corrector image neighbourhood is set by the controller to a default size, the controller configured to adjust the size until the entropy of the image information in the default corresponding corrector image neighbourhood exceeds a predetermined threshold value.

6. A method of correcting an X-ray image for an artifact, the method comprising:
    receiving an initial X-ray image;
    forwarding the initial image to an artifact corrector and to receive therefrom a sample of a corrected image, the sample image being the result of a corrective action applied to the initial image by the artifact corrector;
    comparing the initial image and the corrected sample image to so establish a corrector image representing the corrective action of the artifact corrector on the initial image;
    adaptively re-apply the respective corrective action in a weighted manner to any one of a plurality of image points in the initial image, the weights used per image point for the weighting of the corrective action related to a degree to which image information in a neighbourhood around that image point is compensable by corresponding image information in a corresponding neighbourhood in the corrector image.

7. The method of claim 6, wherein the weights are neighbourhood dependent and indicative of the compensatory degree, the weights attenuating or amplifying the corrective action at any given image point, the attenuation varying inversely to the compensatory degree and the amplification varying directly with the compensatory degree.

8. The method of claim 6, wherein the step of adaptively re-applying the corrective action includes computing the weights to minimize per neighbourhood the entropy of a combination of image information from both, the respective initial image neighbourhood and the corresponding corrector image neighbourhood.

9. The method of claim 6, wherein the step of adaptively re-applying the corrective action includes computing the weights per neighbourhood as a statistical correlation coefficient between image information in the respective initial image neighbourhood and the corresponding image information in the corresponding corrector image neighbourhood.

10. The method of claim 6, comprising:
    prior to the adaptively re-applying the corrective action, adjusting a size until the entropy of the image information in a previously set default sized corresponding corrector image neighbourhood exceeds a predetermined threshold value.

11. A medical image processing system for correcting an image for an image artifact, the system comprising:
    an apparatus of claim 1;
    the artifact corrector;
    a database system holding the initial image.

12. A non-transitory computer readable medium with a computer program element for controlling an apparatus, which, when being executed by a processing unit is adapted to perform the method steps of claim 7.

* * * * *